US00H002079H

(19) United States

(12) Statutory Invention Registration

Menon et al.

(10) Reg. No.: US H2079 H

(43) Published: Sep. 2, 2003

(54) PACKET-BASED WIRELESS LOCAL LOOP AND METHOD

(75) Inventors: Narayan Menon, Colorado Springs, CO (US); Benjamin K. Gibbs, Colorado Springs, CO (US); Ismail E. Sola, Colorado Springs, CO (US)

(73) Assignee: Opuswave Networks, Inc., Colorado Springs, CO (US)

(21) Appl. No.: 09/675,516

(22) Filed: Sep. 29, 2000

(51) Int. Cl.[7] ..... H04Q 7/00

(52) U.S. Cl. ..... 370/329

(56) References Cited

U.S. PATENT DOCUMENTS

| | | | | |
|---|---|---|---|---|
| 4,980,907 | A | 12/1990 | Raith et al. | 379/63 |
| 5,448,619 | A | 9/1995 | Evans et al. | 379/58 |
| 5,463,623 | A | 10/1995 | Grimes et al. | 370/79 |
| 5,537,610 | A | 7/1996 | Mauger et al. | 379/58 |
| 5,555,258 | A | 9/1996 | Snelling et al. | 370/29 |
| 5,602,843 | A | 2/1997 | Gray | 370/338 |
| 5,636,218 | A | 6/1997 | Ishikawa et al. | 370/401 |
| 5,742,905 | A | 4/1998 | Pepe et al. | 455/461 |
| 5,799,250 | A | 8/1998 | Veloso et al. | 455/422 |
| 5,799,254 | A | 8/1998 | Karmi et al. | 455/528 |
| 5,862,134 | A | 1/1999 | Deng | 370/352 |
| 5,884,148 | A | 3/1999 | Bilgic et al. | 455/74.1 |
| 5,949,775 | A | 9/1999 | Rautiola et al. | 370/338 |
| 5,956,331 | A | 9/1999 | Rautiola et al. | 370/338 |
| 5,978,672 | A | 11/1999 | Hartmaier et al. | 455/413 |
| H1836 | H | 2/2000 | Fletcher et al. | 455/433 |
| H1837 | H | 2/2000 | Fletcher et al. | 455/433 |
| 6,075,784 | A | 6/2000 | Frankel et al. | 370/356 |

*Primary Examiner*—Daniel T. Pihulic

(57) ABSTRACT

A packet-based wireless local loop includes a wireless router operable to communicate with a network and a fixed wireless unit operable to communicate with the router over a wireless interface. The fixed wireless unit is operable to transmit a first plurality of packet messages to the router. The first plurality of messages contains analog traffic and data traffic from at least one wired device. The fixed wireless unit is also operable to receive a second plurality of messages from the router. The second plurality of messages contains analog traffic and data traffic, and the fixed wireless unit is further operable to communicate the analog traffic and the data traffic in the second plurality of messages to at least one of the wired devices.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

10
12a
12b
22
14
WIRELESS ROUTER
16a
PSTN GATEWAY
18a
PSTN
24a
26a
28
PACKET NETWORK
20
30
24b
18b
PSTN
PSTN GATEWAY
16b
26b 12
56
50
VOICE/FAX VOCODER SUBSYSTEM
PACKET DATA SUBSYSTEM
58
60
64
62
TELEPHONE INTERFACE
WIRELESS SUBSYSTEM
52
54
22
66
WIRELESS SUBSYSTEM
68
PACKET DATA SUBSYSTEM
14
20
PACKET NETWORK
PSTN GATEWAY
16a

PACKET-BASED WIRELESS LOCAL LOOP AND METHOD

CROSS-REFERENCE TO RELATED APPLICATIONS

This application is related to the following applications:

U.S. application Ser. No. 09/128,553, filed on Aug. 3, 1998, now abandoned and entitled "A 'Plug and Play' Wireless Architecture Supporting Packet Data and IP Voice/Multimedia Services," pending; and U.S. application Ser. No. 09/219,539, filed on Dec. 23, 1998, now abandoned and entitled "Wireless Local Loop System Supporting Voice/IP," pending.

TECHNICAL FIELD OF THE INVENTION

This invention relates generally to the field of communications, and more specifically to a packet-based wireless local loop and method.

BACKGROUND OF THE INVENTION

Wireless local loops have been used for several years to provide telephone service to subscribers. In traditional wireless local loop systems, omni-directional radios are used to link one subscriber or a group of subscribers to a telephone company's central office. Omni-directional radios at the subscribers' locations communicate with radios coupled to the central office, allowing the telephone company to provide service to the subscribers without the use of conventional twisted-pair copper wires. Wireless local loops are often useful because they can be easily reconfigured and do not require expensive copper lines. Wireless local loops are particularly useful in areas where, for example, environmental conditions make it difficult to lay copper lines between the subscriber and the central office.

A single subscriber or group of subscribers may have telephones, fax machines, and computers all connected to the same subscriber line inside a residence or building. Conventional wireless local loop systems are usually able to transport either analog voice and fax traffic or data traffic. A problem with conventional wireless local loop systems is that they cannot transport analog voice and fax and data traffic concurrently. The subscriber must choose which application to use.

Another problem with conventional wireless local loop systems is that the inability to transport analog voice and fax and data traffic concurrently adds complexity to the communications system. To properly handle the different types of traffic, equipment used in the wireless local loop typically needs to differentiate between analog voice and fax traffic and the data traffic. For example, if voice or fax traffic is being routed through a packet data network, equipment typically is needed to convert the analog voice or fax traffic into a format used by the packet network. Once the voice or fax traffic passes through the packet data network, equipment is needed to reconvert the traffic back into an analog format. These and other requirements of a conventional wireless local loop increase the amount and complexity of the equipment used in the local loop. This also increases the complexity and the expense of the overall system.

Further, typical wireless local loops use voice coders and decoders (vocoders) to convert analog voice signals into digital signals and to convert digital signals back into analog voice signals. Typical wireless local loops limit the types of vocoders that can be used in the system. For example, conventional wireless local loops often require that analog voice and fax traffic have a specific structure, which limits the vocoders that may be used in the system. A subscriber is unable to use other vocoders in the local loop, even though the subscriber's preferred vocoder may have better performance, clarity, or security features.

SUMMARY OF THE INVENTION

In accordance with the present invention, a packet-based wireless local loop and method are provided that substantially reduce or eliminate disadvantages and problems associated with previously developed systems and methods.

In one embodiment of the present invention, a packet-based wireless local loop includes a wireless router operable to communicate with a network and a fixed wireless unit operable to communicate with the router over a wireless interface. The fixed wireless unit is operable to transmit a first plurality of packet messages to the router. The first plurality of messages contains analog traffic and data traffic from at least one wired device. The fixed wireless unit is also operable to receive a second plurality of messages from the router. The second plurality of messages contains analog traffic and data traffic, and the fixed wireless unit is further operable to communicate the analog traffic and the data traffic in the second plurality of messages to at least one of the wired devices.

In another embodiment of the present invention, a method for communicating over a wireless local loop includes generating a first plurality of packet messages, the first plurality of messages containing analog traffic and data traffic from at least one wired device. The method also includes communicating the first plurality of messages to a network over a wireless interface, and receiving a second plurality of packet messages from the network over the wireless interface, the second plurality of messages containing analog traffic and data traffic. The method further includes communicating the analog traffic and the data traffic in the second plurality of messages to at least one of the wired devices.

Technical advantages of the present invention include the provisioning of a packet-based wireless local loop and method. In particular, some embodiments of the present invention allow analog voice and fax traffic and data traffic to be carried concurrently in the wireless local loop. The analog traffic and the data traffic may be contained in packets of data, and the wireless local loop may route the packets to an appropriate destination such as another telephone, fax machine, computer, or a gateway to an analog network. In one embodiment, the wireless local loop routes the packets to their destinations without differentiating between the different types of traffic. Treating the analog traffic and the data traffic as packets of data allows all three types of traffic to be handled concurrently in the local loop.

Another technical advantage of some embodiments of the present invention is that the communications system may be less complex than conventional systems. For example, if voice or fax traffic is being routed through a packet data network, the wireless local loop may not need to convert the voice or fax traffic into another format. This allows less complex and less expensive equipment to be used in the communications system, which helps reduce the overall complexity and expense of the system.

In addition, some embodiments of the present invention do not restrict the type of vocoders that may be used in the system. Each subscriber may select which vocoder to use. This may allow, for example, the subscriber to select a vocoder having specific performance, clarity, or security features that are needed for a particular situation. The subscriber may even be able to use a personal vocoder that is unknown to the wireless local loop.

Other technical advantages are readily apparent to one of skill in the art from the attached Figures, description, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. I through 5 of the drawings, like numerals being used for like and corresponding parts of the various drawings.

Figure 1:
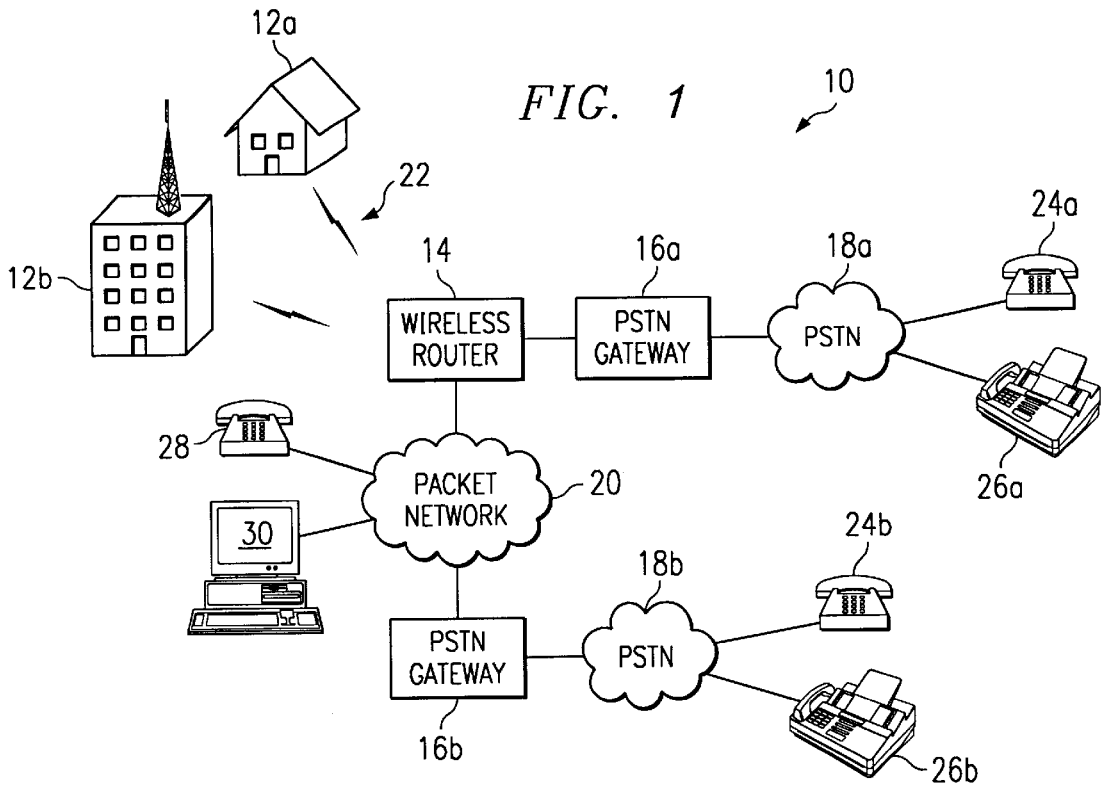
FIG. 1 is a block diagram illustrating an exemplary communications system.

FIG. 1 is a block diagram illustrating an exemplary communications system 10. In the illustrated embodiment, system 10 comprises a plurality of subscribers 12, a wireless router 14, a plurality of public switched telephone network (PSTN) gateways 16, a plurality of PSTNs 18, and a packet network 20. Other embodiments of system 10 may be used without departing from the scope of the present invention.

Subscribers 12 may include individual subscribers 12a and groups of subscribers 12*b*. Subscriber 12 is operable to communicate with wireless router 14 over a wireless interface 22. Throughout this document, the term "communicate" refers to communication between two or more elements in system 10, whether those elements communicate directly with one another or indirectly through one or more intermediate elements in system 10.

Subscriber 12 may include one or more telephones operable to transmit and receive voice traffic and one or more fax machines operable to transmit and receive fax traffic. Subscriber 12 may also include one or more computers operable to transmit and receive voice, fax, and/or data traffic. In this document, voice and fax traffic may be referred to collectively as "analog traffic." The analog traffic may be in the form of an analog signal, a digital version of the analog signal, or a digital version of the analog signal that is broken into packets. The phrase "data traffic" refers to non-voice and non-fax traffic, such as video traffic. The telephone, fax machine, and computer may each communicate using any suitable communications protocol, such as a circuit-switched protocol, a packet-switched protocol, or both.

Figure 2:
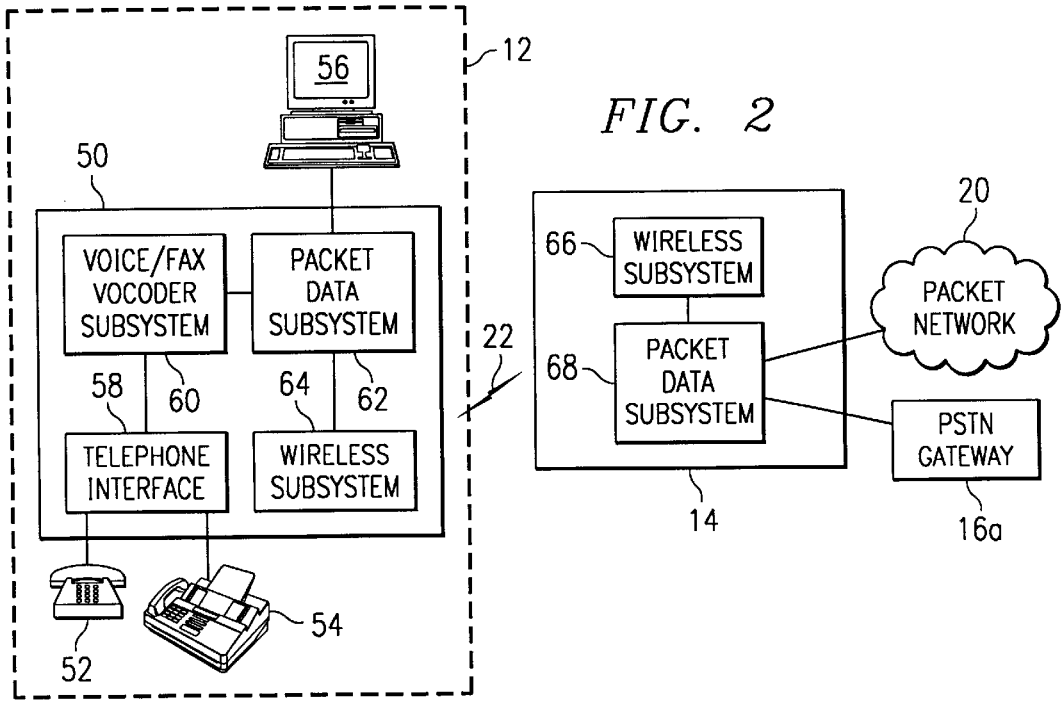
FIG. 2 is a block diagram illustrating an exemplary subscriber and wireless router for the communications system of FIG. 1.

In one embodiment, the voice, fax, and data traffic are communicated over wireless interface 22 in packets of data. At least a portion of a packet comprises the voice, fax, or data traffic. A packet may contain one type of traffic, or the packet may contain multiple types of traffic such as, for example, voice traffic and related data traffic. In this embodiment, subscriber 12 is operable to receive traffic from at least one of the telephone, the fax machine, and the computer. Subscriber 12 packetizes the traffic and communicates the outgoing packets to wireless router 14. Subscriber 12 is also operable to receive incoming packets from wireless router 14. Subscriber 12 may depacketize the traffic contained in the packets and route the traffic to at least one of the telephone, the fax machine, and the computer. Subscriber 12 could also route the packet directly to the computer without depacketizing the traffic in the packet. In a particular embodiment, subscriber 12 and wireless router 14 exchange packets using an Internet Protocol (IP) scheme such as, for example, Transmission Control Protocol/Internet Protocol (TCP/IP). One embodiment of subscriber 12 is shown in FIG. 2, which is described below.

Wireless router 14 is coupled to PSTN gateway 16*a* and packet network 20. Throughout this document, the term "couple" refers to any direct or indirect connection between two or more elements in system 10, whether the elements physically contact one another. Wireless router 14 is operable to provide bi-directional communication with subscribers 12. Wireless router 14 may, for example, transmit and receive messages to and from subscriber 12 using a circuit-switched or a packet-switched protocol. Wireless router 14 is also operable to facilitate communication between subscriber 12 and other elements in system 10. In one embodiment, wireless router 14 receives packets containing voice, fax, and/or data traffic from subscriber 12, and wireless router 14 routes the messages to PSTN gateway 16*a* or packet network 20. Wireless router 14 also receives data packets from PSTN gateway 16*a* and packet network 20 destined for subscriber 12, and wireless router 14 communicates the packets to subscriber 12 over wireless interface 22. Wireless router 14 may comprise any suitable device operable to route data packets in system 10. Wireless router 14 may, for example, comprise a base station, a base station controller coupled to the base station, and a router coupled to the base station or the base station controller. One embodiment of wireless router 14 is shown in FIG. 2, which is described below.

Wireless interface 22 communicatively couples subscriber 12 and wireless router 14. In this document, the term "wireless" designates the use of a radio or over-the-air interface to communicate with subscriber 12. Wireless interface 22 may comprise any suitable circuit-switched or packet-switched wireless interface. For example, mobile station 12 and wireless router 14 may communicate using a Global System for Mobile communication (GSM) interface.

PSTN gateway 16*a* couples wireless router 14 and PSTN 18*a*. PSTN gateway 16*b* couples packet network 20 and PSTN 18*b*. Each PSTN gateway 16 is operable to facilitate communication between components of system 10 and a PSTN 18. PSTN gateway 16 may, for example, perform voice/fax coding and decoding operations to convert between the different protocols used in system 10. PSTN gateway 16 may convert data packets received from wireless router 14 or packet network 20 into analog traffic sent to PSTN 18. PSTN gateway 16 may also convert analog traffic received from PSTN 18 into data packets sent to wireless router 14 or packet network 20. Each PSTN gateway 16 may also perform address translation, converting between an address format used by PSTN 18 and an address format used by wireless router 14 and packet network 20. PSTN gateway 16 may be further operable to identify the vocoder that should be used by subscriber 12 to properly decode incoming packet messages. PSTN gateway 16 may comprise any suitable device operable to facilitate communication with a circuit-switched network.

PSTN 18 is coupled to PSTN gateway 16, a telephone 24, and a fax machine 26. PSTN 18 is operable to facilitate communication between PSTN gateway 16 and telephone 24 or fax machine 26. Telephone 24 may comprise any suitable telephone, including an analog or an integrated services digital network (ISDN) telephone. Fax machine 26 may comprise any suitable device operable to provide facsimile service, including a computer with a fax modem, an analog device, and an ISDN device.

Packet network 20 is coupled to wireless router 14, PSTN gateway 16*b,* Internet phone 28, and computer 30. Packet network 20 is operable to facilitate the transfer of data packets containing voice, fax, and/or data traffic between different components in system 10. Packet network 20 may, for example, facilitate communication between wireless router 14 and PSTN gateway 16*b*. Internet phone 28 may transmit and receive voice traffic over network 20, and computer 30 having voice/fax coding and decoding functionality is operable to transmit and receive voice, fax, and data traffic over network 20. Packet network 20 may comprise any suitable packet-based network. For example, packet network 20 may comprise a local area network (LAN), metropolitan area network (MAN), wide area network (WAN), or other communications system or combination of communications systems at one or more locations.

In one aspect of operation, subscriber 12 communicates with other elements in system 10 through wireless router 14. In one embodiment, subscriber 12 and wireless router 14 may use an IP scheme such as TCP/IP to transfer packets in system 10. Wireless router 14 may receive packets from subscriber 12 that contain voice, fax, and/or data traffic, and wireless router 14 routes the packets to the appropriate destination in system 10. For example, if the packets contain voice or fax traffic, wireless router 14 may route the packets to PSTN gateway 16*a* for transmission to telephone 24*a* or fax machine 26*a*. Wireless router 14 may also route packets containing voice or fax traffic to packet network 20 for transmission to Internet phone 28, computer 30, or PSTN gateway 16*b*. If the packets contain data traffic, wireless router 14 may route the packets to packet network 20 for transmission to a node such as computer 30 in network 20 or in another packet network communicating with network 20. In addition, wireless router 14 may receive packets containing voice, fax, and/or data traffic destined for subscriber 12 from PSTN gateway 16 or packet network 20, and wireless router 14 communicates the incoming packets to subscriber 12 over wireless interface 22. Numerous additional routing scenarios may occur in system 10 without departing from the scope of the present invention.

Although FIG. 1 illustrates one embodiment of system 10, numerous changes may be made to system 10 without departing from the scope of the present invention. For example, system 10 may include any number of wireless routers 14, PSTN gateways 16, PSTNs 18, and packet networks 20. Also, system 10 could include one or more integrated services digital networks (ISDNs), and system 10 could include one or more public land mobile networks (PLMNs) coupled to system 10 by PLMN gateways. Other changes may be made in system 10 without departing from the scope of the present invention.

FIG. 2 is a block diagram illustrating an exemplary subscriber 12 and wireless router 14 for communications system 10 of FIG. 1. In the illustrated embodiment, subscriber 12 comprises a fixed wireless unit 50, a telephone 52, a fax machine 54, and a computer 56. Wireless router 14 comprises a wireless subsystem 66 and a packet data subsystem 68. Other embodiments of subscriber 12 and wireless router 14 may be used without departing from the scope of the present invention.

Fixed wireless unit 50 is coupled to telephone 52, fax machine 54, and computer 56. Telephone 52 may comprise any suitable telephone device, including a wireless telephone that communicates with a telephone cradle at subscriber 12. Fax machine 54 may comprise any suitable device operable to provide facsimile service, including a computer with a fax modem. Computer 56 may comprise any suitable computing device operable to communicate with fixed wireless unit 50 and exchange voice, fax, and/or data traffic. The traffic from computer 56 may be contained in packets of data, or fixed wireless unit 50 may packetize traffic from computer 56 that is not already contained in packets. To support the transfer of voice and fax traffic, computer 56 may include voice/fax vocoder functionality.

Fixed wireless unit 50 facilitates communication between conventional wired devices and wireless router 14 by providing a wireless link between subscriber 12 and wireless router 14. "Wired devices" include devices that conventionally use wired connections for communication with a network over a local loop. "Wired devices" include telephone 52, fax machine 54, and/or computer 56 at subscriber 12.

Fixed wireless unit 50 transmits and receives packets of voice, fax, and data traffic to and from wireless router 14. Fixed wireless unit 50 may comprise any suitable device operable to facilitate wireless communication between subscriber 12 and wireless router 14. In the illustrated embodiment, fixed wireless unit 12 comprises a telephone interface 58, a voice/fax vocoder subsystem 60, a packet data subsystem 62, and a wireless subsystem 64.

Telephone interface 58 is coupled to telephone 52, fax machine 54, and voice/fax vocoder subsystem 60. Telephone interface 58 is operable to facilitate communication between telephone 52, fax machine 54, and voice/fax vocoder subsystem 60. Telephone interface 58 may, for example, perform analog-to-digital and digital-to-analog conversions to convert between a digital format used by voice/fax vocoder subsystem 60 and an analog format used by telephone 52 and fax machine 54. Telephone interface 58 may also perform dual tone multi-frequency (DTMF) decoding to support push button dialing in telephone 52 or fax machine 54. In addition, telephone interface 58 may perform other functions such as, for example, provisioning loop current and ring voltage. Telephone interface 58 may comprise any suitable device operable to facilitate communication between telephone 52, fax machine 54, and voice/fax vocoder subsystem 60.

Voice/fax vocoder subsystem 60 is coupled to telephone interface 58 and packet data subsystem 62. Voice/fax vocoder subsystem 60 is operable to facilitate communication between telephone interface 58 and packet data subsystem 62. Voice/fax vocoder subsystem 60 is also operable to perform coding and decoding functions to packetize and depacketize voice and fax traffic. Voice/fax vocoder subsystem 60 may, for example, receive digitized voice and fax traffic from telephone interface 58 and place the traffic into one or more packets. Voice/fax vocoder subsystem 60 may also receive packets containing voice and fax traffic from packet subsystem 62 and remove the traffic from the packets. Voice/fax vocoder subsystem 60 may comprise any suitable device operable to perform vocoding functions. Voice/fax vocoder subsystem 60 may support a single vocoder or multiple vocoders, and voice/fax vocoder subsystem 60 may also support personal vocoders defined by subscriber 12.

Packet data subsystem 62 is coupled to voice/fax vocoder subsystem 60, computer 56, and wireless subsystem 64. Packet data subsystem 62 is operable to facilitate communication between telephone 52, fax machine 54, computer 56, and wireless subsystem 64. In one embodiment, packet data subsystem 62 supports the functions and protocols needed to transfer packets containing voice, fax, and/or data traffic between subscriber 12 and wireless router 14. Packet data subsystem 62 may, for example, support the routing of incoming messages received from wireless router 14 to telephone 52, fax machine 54, or computer 56. In one embodiment, packet data subsystem 62 is also operable to determine a destination address for the outgoing packets, and packet data subsystem 62 adds appropriate headers to the packets so that wireless router 14 may route the packets to that destination in system 10. Packet data subsystem 62 may comprise any suitable device operable to facilitate the communication of data packets between subscriber 12 and wireless router 14.

Wireless subsystem 64 in subscriber 12 is coupled to packet data subsystem 62. Wireless subsystem 66 in wireless router 14 is coupled to packet data subsystem 68. Wireless subsystems 64, 66 are operable to facilitate communication between subscriber 12 and wireless router 14 by managing communications channels over wireless interface 22. Wireless subsystems 64, 66 may, for example, establish a communications channel over wireless interface 22 and then transmit and receive data packets over wireless interface 22. In one embodiment, wireless subsystems 64, 66 release the communications channel once communication over wireless interface 22 is complete. In another embodiment, wireless subsystems 64, 66 maintain a constant connection over wireless interface 22. Wireless subsystems 64, 66 are operable to support any suitable communications protocol. Wireless subsystems 64, 66 may use a circuit-switched protocol, a packet-switched protocol, or both to communicate over wireless interface 22. Wireless subsystems 64, 66 may each comprise any suitable device operable to manage one or more communications channels over wireless interface 22.

Packet data subsystem 68 is coupled to wireless subsystem 66, packet network 20, and PSTN gateway 16*a*. Packet data subsystem 68 is operable to facilitate communication between wireless router 14 and components in system 10. Packet data subsystem 68 may, for example, support the routing of messages received from subscriber 12 to packet network 20 or PSTN gateway 16*a*. In one embodiment, packet data subsystem 68 is also operable to determine a destination address of the packets, and packet data subsystem 68 adds appropriate headers to the packets so that the packets may be routed to that destination. Packet data subsystem 68 may also receive messages from PSTN gateway 16 or packet network 20 destined for subscriber 12. Packet data subsystem 68 may comprise any suitable device operable to facilitate the communication of data packets between wireless router 14, PSTN gateway 16, and packet network 20.

In one aspect of operation, fixed wireless unit 50 and wireless router 14 communicate over wireless interface 22 and exchange voice, fax, and data traffic contained in data packets. Fixed wireless unit 50 is operable to receive voice traffic from telephone 52, fax traffic from fax machine 54, and voice, fax, and/or data traffic from computer 56. Fixed wireless unit 50 is also operable to packetize the voice and fax traffic from telephone 52 and fax machine 54, and fixed wireless unit 50 may packetize traffic from computer 56 that is not already contained in data packets. The packets are communicated to wireless router 14 over wireless interface 22. Wireless router 14 routes the packets to an appropriate location in system 10. If the packets are going to PSTN 18, subscriber 12 or wireless router 14 determines an address for a PSTN gateway 16, and wireless router 14 communicates the packets to that PSTN gateway 16. If the packets are going to packet network 20, subscriber 12 or wireless router 14 determines an address for a destination node in network 20, and wireless router 14 communicates the packets to that node.

Wireless router 14 may also receive data packets from PSTN gateway 16 or packet network 20 destined for subscriber 12. Wireless router 14 communicates the packets to fixed wireless unit 50. Fixed wireless unit 50 determines whether the packets are destined for telephone 52, fax machine 54, or computer 56. Voice, fax, and/or data traffic may be sent to computer 56, and voice and fax traffic may be sent to telephone interface 58.

By supporting the concurrent transfer of analog traffic and data traffic using packets of data, fixed wireless unit 50 and wireless router 14 provide several advantages over prior wireless local loops. For example, system 10 simplifies the handling of voice, fax, and data traffic by using packets of data to transport the traffic. In one embodiment, the different types of traffic are handled similarly in system 10 until the analog traffic enters an analog network such as PSTN 18. When the analog traffic is entering PSTN 18, system 10 converts the packetized analog traffic into an analog signal. Also, because traffic is handled as packets of data, system 10 supports voice telephone calls to and from packet data networks like the Internet. In addition, since the traffic is handled as packets, conversion of the traffic may be unnecessary between the wireless local loop and packet network 20.

Although FIG. 2 illustrates one embodiment of subscriber 12 and wireless router 14, numerous changes may be made without departing from the scope of the present invention. For example, although subscriber 12 is illustrated as comprising telephone 52, fax machine 54, and computer 56, subscriber 12 need not include all three elements. Subscriber 12 could, for example, comprise only telephone 52 or telephone 52 and computer 56. Also, although fixed wireless unit 50 is illustrated as comprising separate modules for telephone interface 58, voice/fax vocoder subsystem 60, packet data subsystem 62, and wireless interface 64, one or more of these modules may be combined in a single physical unit. For example, a single physical unit could perform the functions of telephone interface 58 and voice/fax vocoder subsystem 60. Other changes may be made to system subscriber 12 or wireless router 14 without departing from the scope of the present invention.

Figure 3:
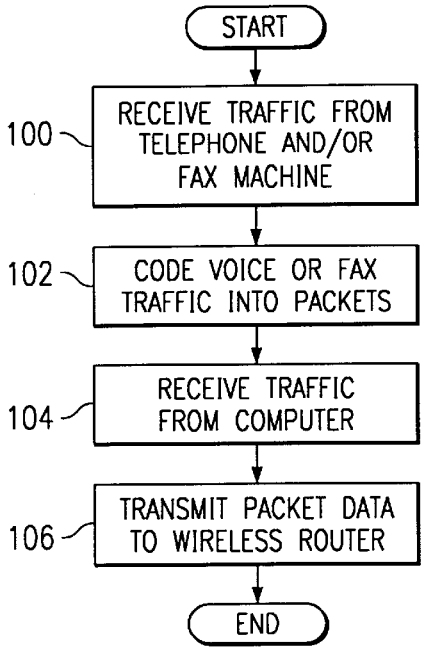
FIG. 3 is a flowchart illustrating an exemplary method for handling outgoing traffic in a fixed wireless unit.

FIG. 3 is a flowchart illustrating an exemplary method for handling outgoing traffic in fixed wireless unit 50. Fixed wireless unit 50 receives traffic from telephone 52 and/or fax machine 54 at a step 100. This may include, for example, telephone interface 58 receiving the traffic from telephone 52 or fax machine 54. Fixed wireless unit 50 codes the voice or fax traffic into packets at a step 102. This may include, for example, telephone interface 58 digitizing the analog signals received from telephone 52 or fax machine 54 and voice/fax vocoder subsystem 60 packetizing the digitized traffic. Fixed wireless unit 50 may also receive traffic from computer 56 at a step 104. This may include, for example, packet data subsystem 62 receiving the traffic from computer 56. The traffic from computer 56 may comprise voice, fax, and/or data traffic, and the traffic may or may not already be packetized. Fixed wireless unit 50 communicates the packets containing the traffic to wireless router 14 at a step 106. This may include, for example, packet data subsystem 62 addressing the packets to a destination in system 10 and wireless subsystem 64 communicating the packet data to wireless router 14.

Figure 4:
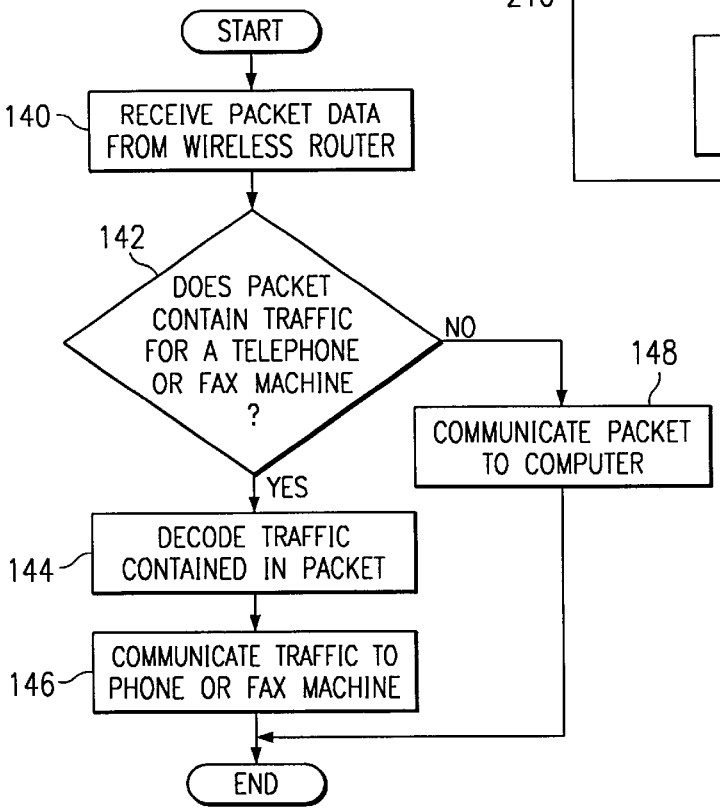
FIG. 4 is a flowchart illustrating an exemplary method for handling incoming traffic in a fixed wireless unit.

FIG. 4 is a flowchart illustrating an exemplary method for handling incoming traffic in fixed wireless unit 50. Fixed wireless unit 50 receives incoming packets of data from wireless router 14 at a step 140. This may include, for example, wireless subsystem 64 receiving the packets from wireless router 14 over wireless interface 22. Fixed wireless unit 50 determines whether the packet contains traffic destined for telephone 52 or fax machine 54 at a step 142. This may include, for example, packet data subsystem 62 determining whether the packet is addressed to telephone 52, fax machine 54, or computer 56. If the packet contains traffic destined for telephone 52 or fax machine 54, fixed wireless unit 50 decodes the voice or fax traffic at a step 144. This may include, for example, voice/fax vocoder subsystem 60 depacketizing the traffic and telephone interface 58 converting the digital data into an analog signal. Fixed wireless unit 50 communicates the analog voice or fax traffic to telephone 52 or fax machine 54 at a step 146. This may include, for example, telephone interface 58 routing the traffic to telephone 52 and/or fax machine 54. If the packet received from wireless router 14 contains traffic destined for computer 56 at step 142, fixed wireless unit 50 communicates the traffic to computer 56 at a step 148. This may include, for example, packet data subsystem 62 transferring the packet or the traffic in the packet to computer 56.

Figure 5:
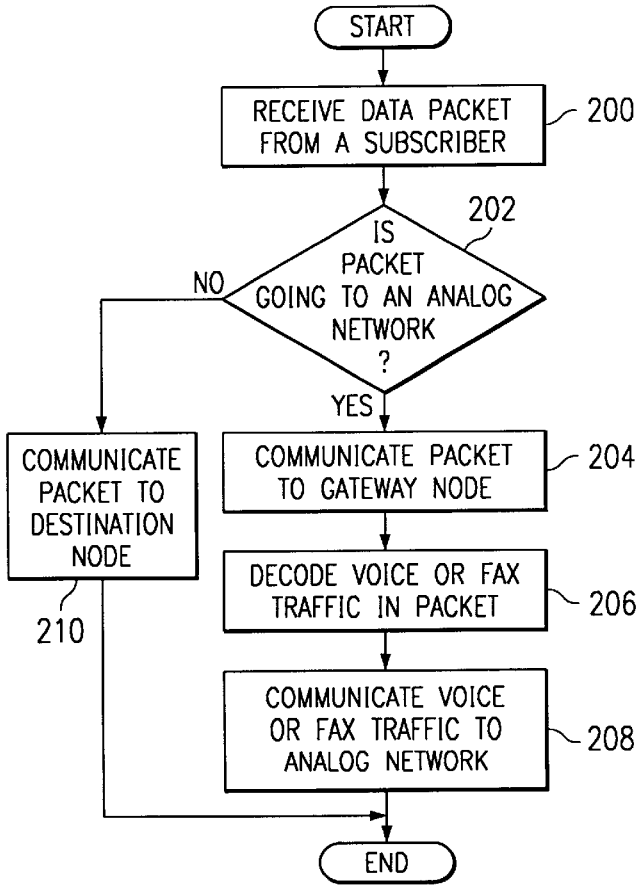
FIG. 5 is a flowchart illustrating an exemplary method for handling traffic from a subscriber's fixed wireless unit.

FIG. 5 is a flowchart illustrating an exemplary method for handling traffic from a subscriber's fixed wireless unit 50. System 10 receives voice, fax, and/or data traffic from subscriber 12 at a step 200. This may include, for example, wireless subsystem 66 in wireless router 14 receiving packets from subscriber 12 over wireless interface 22. In one embodiment, subscriber 12 and wireless router 14 communicate using an IP protocol. System 10 determines if the packet is going to an analog network such as PSTN 18 at a step 202. This may include, for example, determining the destination address of the packet. The destination address may already be included in the packet, or wireless router 14 may determine an address for the packet. The address may be for a PSTN gateway 16 providing access to the analog network or for a destination node in packet network 20.

If the packet is going to an analog network at step 202, wireless router 14 routes the packet to the gateway at a step 204. This may include, for example, wireless router 14 communicating the packet directly to PSTN gateway 16*a* coupled to wireless router 14. This may also include wireless router 14 routing the message through packet network 20 to another PSTN gateway 16*b*. System 10 decodes the voice or fax traffic contained in the packet at a step 206 This may include, for example, PSTN gateway 16 receiving the packet, extracting the voice or fax traffic from the packet, and converting the digital data into an analog signal. System 10 communicates the voice or fax traffic to the analog network at a step 208 This may include, for example, PSTN gateway 16 communicating the analog voice or fax traffic to PSTN 18.

If the packet is going to a node in a packet network at step 202, wireless router 14 communicates the data packet to the destination node at a step 210. This may include, for example, wireless router 14 routing the message to a node coupled to packet network 20. This may also includes router 14 routing the message to another packet network that communicates with packet network 20.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A wireless unit for a packet-based wireless local loop, comprising:

a wireless subsystem operable to communicate with a network over a wireless interface, the wireless subsystem operable to transmit a first plurality of packet messages to the network and to receive a second plurality of packet messages from the network;

a packet data subsystem coupled to the wireless subsystem, the packet data subsystem operable to communicate the first plurality of packet messages to the wireless subsystem, the first plurality of messages containing analog traffic and data traffic from at least one wired device; and the packet data subsystem also operable to receive the second plurality of messages from the wireless subsystem, the second plurality of messages containing analog traffic and data traffic, the packet data subsystem further operable to communicate the analog traffic and the data traffic in the second plurality of messages to at least one of the wired devices.

2. The wireless unit of claim 1, further comprising an interface coupled to the packet data subsystem and operable to transfer analog traffic between the wired device and the packet data subsystem.

3. The wireless unit of claim 2, wherein the interface is operable to digitize an analog signal received from the wired device and to convert digitized analog traffic received from the packet data subsystem into an analog signal.

4. The wireless unit of claim 1, further comprising a vocoder coupled to the packet data subsystem, the vocoder operable to packetize analog traffic from the wired device to generate at least one of the first plurality of messages, the vocoder also operable to depacketize analog traffic contained in at least one of the second plurality of messages.

5. The wireless unit of claim 1, wherein the packet data subsystem is operable to receive at least one of the first plurality of messages from the wired device.

6. The wireless unit of claim 1, wherein the traffic is transported in the first and second plurality of messages using an Internet Protocol.

7. A packet-based wireless local loop, comprising:

a wireless router operable to communicate with a network;

a fixed wireless unit operable to communicate with the router over a wireless interface, the fixed wireless unit operable to transmit a first plurality of packet messages to the router, the first plurality of messages containing analog traffic and data traffic from at least one wired device; and the fixed wireless unit also operable to receive a second plurality of messages from the router, the second plurality of messages containing analog traffic and data traffic, the fixed wireless unit further operable to communicate the analog traffic and the data traffic in the second plurality of messages to at least one of the wired devices.

8. The wireless local loop of claim 7, wherein the fixed wireless unit comprises:

a wireless subsystem operable to communicate with the router; and a packet data subsystem coupled to the wireless subsystem, the packet data subsystem operable to communicate the first plurality of messages to the wireless subsystem and to receive the second plurality of messages from the wireless subsystem.

9. The wireless local loop of claim 8, wherein the fixed wireless unit further comprises an interface coupled to the packet data subsystem and operable to transfer analog traffic between the wired device and the packet data subsystem.

10. The wireless local loop of claim 9, wherein the interface is operable to digitize an analog signal received from the wired device and to convert digitized analog traffic received from the packet data subsystem into an analog signal.

11. The wireless local loop of claim 8, wherein the fixed wireless unit further comprises a vocoder coupled to the packet data subsystem, the vocoder operable to packetize analog traffic from the wired device to generate at least one of the first plurality of messages, the vocoder also operable to depacketize analog traffic contained in at least one of the second plurality of messages.

12. The wireless local loop of claim 8, wherein the packet data subsystem is operable to receive at least one of the first plurality of messages from the wired device.

13. The wireless local loop of claim 7, further comprising a gateway coupled to the wireless router and operable to communicate with the network.

14. The wireless local loop of claim 7, wherein the traffic is transported in the first and second plurality of messages using an Internet Protocol.

15. A method for communicating over a wireless local loop, comprising:

generating a first plurality of packet messages, the first plurality of messages containing analog traffic and data traffic from at least one wired device;

communicating the first plurality of messages to a network over a wireless interface;

receiving a second plurality of packet messages from the network over the wireless interface, the second plurality of messages containing analog traffic and data traffic; and communicating the analog traffic and the data traffic in the second plurality of messages to at least one of the wired devices.

16. The method of claim 15, wherein generating the first plurality of messages comprises:

receiving an analog signal from the wired device;

digitizing the analog signal; and packetizing the digitized analog signal to generate at least one of the first plurality of messages.

17. The method of claim 15, wherein generating the first plurality of messages comprises receiving at least one of the messages from the wired device.

18. The method of claim 15, wherein communicating the first plurality of messages to a network comprises communicating the first plurality of messages to a gateway coupled to the network.

19. The method of claim 15, wherein the analog traffic in the second plurality of messages comprises digitized analog traffic, and wherein communicating the analog traffic and data traffic in the second plurality of messages to at least one of the wired devices comprises:

depacketizing the digitized analog traffic in at least one of the second plurality of messages;

converting the digitized analog traffic into an analog signal; and communicating the analog signal to the wired device.

20. The method of claim 15, wherein the traffic is transported in the first and second plurality of messages using an Internet Protocol.

* * * * *